(12) United States Patent
Simon

(10) Patent No.: US 7,426,443 B2
(45) Date of Patent: Sep. 16, 2008

(54) DEVICE FOR DETERMINING AND/OR MONITORING THE VOLUME FLOW RATE AND/OR MASS FLOW RATE OF A MEDIUM TO BE MEASURED

(75) Inventor: Antoine Simon, St. Louis (FR)

(73) Assignee: Endress + Hauser Flowtec AG, Reinach (CH)

( * ) Notice: Subject to any disclaimer, the term of this patent is extended or adjusted under 35 U.S.C. 154(b) by 0 days.

(21) Appl. No.: 10/584,149

(22) PCT Filed: Dec. 15, 2004

(86) PCT No.: PCT/EP2004/053515

§ 371 (c)(1),
(2), (4) Date: Mar. 30, 2007

(87) PCT Pub. No.: WO2005/064284

PCT Pub. Date: Jul. 14, 2005

(65) Prior Publication Data

US 2008/0059085 A1   Mar. 6, 2008

(30) Foreign Application Priority Data

Dec. 23, 2003   (DE) ................................ 103 61 464

(51) Int. Cl.
*G01F 1/00* (2006.01)
*G01F 7/00* (2006.01)

(52) U.S. Cl. ........................................................ 702/48
(58) Field of Classification Search .................... 702/48
See application file for complete search history.

(56) References Cited

U.S. PATENT DOCUMENTS

| | | | | | |
|---|---|---|---|---|---|
| 5,343,737 | A | * | 9/1994 | Baumoel | 73/40.5 R |
| 6,026,693 | A | * | 2/2000 | Baumoel et al. | 73/861.27 |
| 6,386,047 | B2 | * | 5/2002 | Chang | 73/861.29 |
| 6,550,345 | B1 | * | 4/2003 | Letton | 73/861.27 |
| 6,601,005 | B1 | | 7/2003 | Eryurek et al. | |
| 2004/0011141 | A1 | * | 1/2004 | Lynnworth | 73/861.27 |
| 2006/0278015 | A1 | * | 12/2006 | Wiest et al. | 73/861.18 |
| 2007/0151364 | A1 | * | 7/2007 | Wiest et al. | 73/861.27 |
| 2007/0234791 | A1 | * | 10/2007 | Wiest et al. | 73/170.13 |
| 2008/0034887 | A1 | * | 2/2008 | Rieder et al. | 73/861.28 |

(Continued)

FOREIGN PATENT DOCUMENTS

DE   1 211 488 A2   6/2002

(Continued)

*Primary Examiner*—Michael P. Nghiem
*Assistant Examiner*—Cindy H Khuu
(74) *Attorney, Agent, or Firm*—Bacon & Thomas, PLLC

(57) ABSTRACT

A ultrasonic flow measuring device, which is distinguished by a low energy consumption. A control/evaluation unit ascertains a plurality of sampled values ($a_i$ with i=1, 2, 3, ...) of a received measuring signal at defined points in time (t) of a predetermined time range and interpolates the sampled values by a continuous function (f(t)), wherein the continuous function (f(t)) is formed by a sum of a predetermined number ($n \in N$) of wavelets (W) and wherein each wavelet (W) corresponds to the product of a sampled value with a sine function $$\left(\frac{\sin(x)}{x}\right)$$

and with a Gaussian bell curve ($e^{-\alpha x^2}$, $\alpha \in R$).

9 Claims, 2 Drawing Sheets

U.S. PATENT DOCUMENTS

2008/0060448 A1 * 3/2008 Wiest et al. .............. 73/861.27

FOREIGN PATENT DOCUMENTS

| DE | 101 06 308 C1 | 7/2002 |
| EP | 0 312 224 A1 | 4/1989 |
| EP | 0 452 531 B1 | 10/1991 |
| EP | 0 624 866 B1 | 11/1994 |

* cited by examiner

DEVICE FOR DETERMINING AND/OR MONITORING THE VOLUME FLOW RATE AND/OR MASS FLOW RATE OF A MEDIUM TO BE MEASURED

TECHNICAL FIELD

The invention relates to a device for determining and/or monitoring volume flow and/or mass flow, e.g. volume flow rate and/or mass flow rate, of a medium flowing in a stream direction through a pipeline.

BACKGROUND DISCUSSION

The device includes: at leas two ultrasonic transducers, which emit ultrasonic measuring signals into the pipeline and receive ultrasonic measuring signals from the pipeline; and a control/evaluation unit, which ascertains the volume and/or mass flow of the medium in the pipeline on the basis of the travel time difference of the ultrasonic measuring signals in the stream direction and counter to the stream direction. Ultrasonic flow measuring devices are often used in process and automation technology. They make possible contactless determination of volume flow and/or mass flow of a medium in a pipeline.

In the case of the aforementioned travel time difference principle, the different travel times of ultrasonic measuring signals in the stream direction and counter to the stream direction of the medium are ascertained and evaluated. To this end, the ultrasonic measuring signals are alternately emitted by one of the ultrasonic transducers in the flow direction and counter to the flow direction of the medium and, in each case, received by the other of the ultrasonic transducers. From the travel time difference of the ultrasonic measuring signals, the flow velocity can be determined, and with that, at known diameter of the pipeline, volume flow, respectively at known or measured density of the medium, mass flow.

Regarding types of measuring devices, one distinguishes between ultrasonic flow measuring pickups inserted into the pipeline, and clamp-on flow measuring devices, where the ultrasonic sensors are pressed externally onto the pipeline by means of a clamping mechanism. Clamp-on flow measuring devices are described, for example, in EP 0 686 255 B1, and in U.S. Pat. No. 4,484,478 and U.S. Pat. No. 4,598,593.

In the case of both types of ultrasonic flow measuring devices, the ultrasonic measuring signals are radiated into, and/or received from, the pipeline, or measuring tube, in which the flowing medium is located, at a predetermined angle. In order to achieve an optimum impedance matching, the ultrasonic measuring signals are coupled into the pipeline, respectively out of the pipeline via a transitional member, e.g. a coupling wedge. Main component of an ultrasonic transducer is, furthermore, at least one piezoelectric element, which produces and/or receives the ultrasonic measuring signals.

Usually, the ultrasonic measuring signals used for the volume flow and/or mass flow measurement involve broadband pulses. Of course, exactly in the case of pipelines and measuring tubes of small nominal diameter, the time separation between the emission and reception of the ultrasonic measuring signal is relatively small. In order, in such case, to be able to achieve a sufficient resolution and, therefore, to be able to perform a reliable measurement, the measuring signal is sampled with a sampling rate, which, on the one hand, is smaller than the time duration lying between the emitting and receiving of an ultrasonic measuring signal and which, on the other hand, is sufficiently small that, within the measuring pulse length, a plurality of sample values are sampled. The sampling rate is, as a result, relatively high. The sampled values, respectively the sampled amplitude values, of the ultrasonic measuring signal are fed to an A/D converter. A control/evaluation unit, e.g. a DSP, uses the sampled values to interpolate the received measuring signal by a continuous function, respectively to reconstruct it as close as possible to what it really is. Mathematically, this subject matter can be represented by the continuous function $f(t)=f(n \cdot T)=a_n$, wherein $n=1, 2, 3, \ldots$, thus a natural number, and wherein the coefficients $\alpha_n$ represent the amplitude values of the ultrasonic measuring signal measured at the points in time $(n \cdot T)$.

In the simplest case, the function is a successive, linear connection of, in each case, two sample values following one after the other. Since this method is not sufficient for measurements of increased accuracy in the field of ultrasonic flow measurement, it is known to apply the Lagrange interpolation, or the yet more complex interpolation of Levenberg-Markart, for the reconstruction of the received measuring signal.

The best and, indeed, most exact theoretical interpolation method for signals reconstructed from sampled values lies, without doubt, in the use of the Shannon-Nyquist Theorem, according to which a bounded, continuous function, e.g. an ultrasonic measuring pulse, can be represented by an infinite sum of weighted sinc functions $\sin(x)/x$. The correct formula is as follows, wherein t represents time and T is the time separation between two sampled values:

$$f(t) = \sum_{n=-\infty}^{+\infty} a_n \cdot \frac{\sin\left[\pi\left(\frac{t}{T} - n\right)\right]}{\pi\left(\frac{t}{T} - n\right)}$$

Problematic with the use of this formula is that the reconstruction of the measuring signal is only 100-percent correct, when the number of sampled values is infinite. In order to be able to apply the Shannon-Nyquist Theorem in practice, it is, naturally, necessary to limit the number of sampled, measured values on the upper end. In doing this, it is to be heeded that the number of sampled values be sufficiently large, in order that a sufficient and adequate reconstruction of the received measuring signal can be achieved. An issue here is a smallest possible calculation time, respectively an adequately large capacity of the microprocessor doing the work of the control/evaluation unit. In the case of the currently known evaluation methods for highly accurate flow measurements by means of ultrasound, the energy requirement for the delivery of ('almost') real-time measurements is so large, that, here, only four-wire measuring devices seem suitable. The use of so-called low-energy devices, especially two-conductor ultrasonic flow measuring devices, has, so far, not been possible, due to the high energy requirement. As already indicated, the high energy requirement is primarily a result of the required large calculative capacity of the microprocessor, or DSP, as the case may be. Lastly, the high energy requirement is a result of the complex evaluation methods, which are required for highly dynamic measurements (especially in the field of real-time measurement) with high measurement accuracy.

SUMMARY OF THE INVENTION

An object of the invention is to provide an ultrasonic flow measuring device with low energy consumption.

The object is achieved by the following features: That the control/evaluation unit ascertains, at defined points in time (t) of a predetermined time range, a plurality of sampled values ($a_i$, with i=1, 2, 3, ...) of a received measuring signal; that the control/evaluation unit interpolates the predetermined time range of the measuring signal by a continuous function (f(t)); wherein the continuous function (f(t)) is formed by a sum of a predetermined number ($n \in N$) of wavelets (W); and wherein each wavelet (W) corresponds to the product of a sampled value with a sinc function $$\left(\frac{\sin(x)}{x}\right)$$

and with a Gaussian bell curve ($e^{-\alpha x^2}$, $\alpha \in R$). As already explained above, the problem with the function sin (x)/x is that it converges to zero much too slowly for practical applications. The function sin(x)/x is quasi equal to zero first at minus-infinity, respectively plus-infinity. By forming the product with the rapidly falling, above-referenced Gaussian bell curve, this problem can be elegantly circumnavigated, whereby the calculative capacity of the control/evaluation unit, as well as its energy requirement, can be significantly reduced. The saving lies, with reference to the methods which have been known so far, at a factor ranging in the order of magnitude of 10 to 100.

In an advantageous further development of the device of the invention, it is provided that the control/evaluation unit ascertains between the sampled values at least one additional sampled value and approximates this sampled value, or values, by the continuous function, wherein the continuous function is formed by the sum of a predetermined number ($n \in N$) of wavelets (W) and wherein each wavelet (W) corresponds to the product of a sampled value with a sinc function $$\left(\frac{\sin(x)}{x}\right)$$

and with a Gaussian bell curve ($e^{-\alpha x^2}$, $\alpha \in R$). This method is already known in another context and bears the name, oversampling. By the intermediate sampling and intermediate value calculation, a better resolution of the sampled, received measuring signal can be achieved, and, therefore, a higher measurement accuracy in the determining of the volume, or mass, flow.

Additionally, a favorable embodiment of the device of the invention provides that the control/evaluation unit determines an abscissa value (t), at which an ordinate value of the continuous function (f(t)) reaches a predetermined limit value. Preferably, the predetermined limit value of the continuous function (f(t)) is a maximum. It can, however, likewise be a zero point, a minimum or an inflection point.

Preferably, the control/evaluation unit determines the abscissa value (tmax, tmin) at the maximum and/or at the minimum on the basis of the first derivative f'(t) of the continuous function. This ascertained abscissa value is, subsequently, in each case, the immediate reference value for the travel time of the measuring signal in the stream direction, respectively counter to the stream direction.

An especially advantageous embodiment of the device of the invention provides that the control/evaluation unit obtains the abscissa value (tmax), at which the continuous function reaches a maximum, by a linear interpolation of the first derivative of the continuous function (f(t)) according to the following formula, wherein t0 designates the abscissa value of a first approximation, in which a maximum or minimum is measured in the time interval (t0−T, t0+T), and f''(t) represents the second derivative of the continuous function (f(t)):

$$t_{max} = t0 - \frac{f'(t0)}{f''(t0)}$$

In connection with the device of the invention, it is viewed as especially favorable, when the control/evaluation unit correlates, with one another, two ultrasonic measuring signals in two time ranges, interpolates the corresponding, discrete sampling of correlation points by a continuous function (f(t)) and determines the abscissa value for the continuous function (f(t)), at which the ordinate value reaches the maximum, wherein such abscissa value is a measure for the time shift between the ultrasonic measuring signals sent and received in the stream direction and counter to the stream direction. The result of this evaluation thus delivers directly the time difference between the two ultrasonic measuring signals sent and received in different directions.

The measurement accuracy of the ultrasonic flow measuring device depends decisively on the correct, respectively optimum, choice of the coefficient $\alpha$ of the Gaussian bell curve. In order to assure that the coefficient $\alpha$ is determined optimally, it is, in an advantageous embodiment of the device of the invention, determined as a function of the number of measured points (MaxSamplei). Especially, the calculate/control unit ascertains, in each case, by means of a mathematical simulation program, an optimum value for the coefficient $\alpha$ as a function of the number of measured points (MaxSamplei).

Preferably, a memory unit is provided, in which, in each case, the optimum value for the coefficient $\alpha$ is stored as a function of the number of measured points (MaxSample). For example, the values are stored in a table. With this method, it is possible, as a result, to save calculating time and energy, since the particular value can be taken, as needed, simply from the table. As a function of the, in each case, required measurement accuracy and/or as a function of the instantaneously available energy, it is possible always to achieve an optimum measurement result.

Due to the low energy consumption, it is possible to embody the ultrasonic flow measuring device as a two-conductor flow measuring device. Two-conductor technology means, that energy supply of the device, measured value transmission to a remote control location, and, as required, configuring and parametering of the device from the remote control location, all are accomplished solely over two lines. Since wiring cost usually represent a relatively high fraction of total cost, considerable savings can be achieved here. Due to the low energy consumption, it is, moreover, also possible to equip the flow measuring device with an internal energy source. Communications with a remote control location can occur via lines, or wirelessly, e.g. via radio communication.

BRIEF DESCRIPTION OF THE DRAWINGS

The invention will now be explained in greater detail on the basis of the appended drawings, the figures of which show as follows.

DETAILED DESCRIPTION OF THE DRAWINGS

Figure 1:
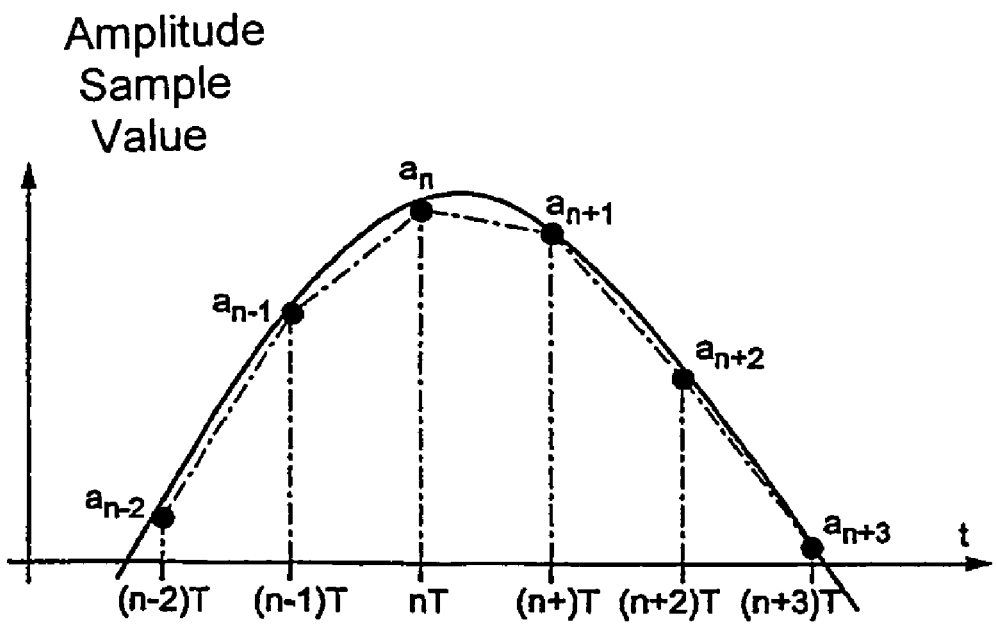
FIG. 1 a schematic presentation of a diagram, in which the scanned amplitude values of a measuring signal are plotted against time (→ state of the art)

In FIG. 1, the amplitude values $a_n$ of six sampled values, which were sampled at time intervals T, are plotted against time. The linear connections between neighboring measurement points are shown by dashed lines. The solid curve f(t) characterizes a curve, which was found using one of the known reconstruction algorithms, e.g. according to Lagrange, or according to Levenberg-Markart. Disadvantage of the known methods is the high calculational effort and the high energy consumption of the control/evaluation unit, respectively the microprocessor or DSP, involved therewith.

According to the invention, the control/evaluation unit 11 ascertains a plurality of sampled values ($a_i$, with i=1, 2, 3, ...) of a received measuring signal at defined points in time (t) within a predetermined time range. Then, the sampled values in the predetermined time range are interpolated by a continuous function (f(t)), with the continuous function (f(t)) being formed by a sum of a predetermined number (n ∈ N) of wavelets (W) and with each wavelet (W) corresponding to the product of a sampled value with a sinc function $$\left(\frac{\sin(x)}{x}\right)$$

and with a Gaussian bell curve ($e^{-\alpha x^2}$, $\alpha \in R$).

In the time domain, the formula has the following form:

$$f(t) = \sum_{n=-\infty}^{+\infty} a_n \cdot g\left[\pi\left(\frac{t}{T} - n\right)\right] = \sum_{n=-\infty}^{+\infty} a_n \cdot \frac{\sin\left[\pi\left(\frac{t}{T} - n\right)\right]}{\pi\left(\frac{t}{T} - n\right)} e^{-\alpha\left[\pi\left(\frac{t}{T} - n\right)\right]^2}$$

By means of the above calculation, an efficient and rapid interpolation can be achieved at relatively small calculational capacity.

Let us consider the case of oversampling and assume that the oversampling rate is equal to σ, where σ is a whole number and greater than or equal to 2. As a result, each sampling range of duration T is divided into σ sampling range portions of duration T/σ.

In the following, let us concentrate on the time range $-T/2 < t \leq +T/2$. Of course, also other values of t can be calculated, analogously, by shifting the sampling range correspondingly. The formula for the function f(iT/σ) is, for i in the range $-(\sigma/2+1) \leq i \leq +(\sigma/2)$, wherein i ≠ 0:

$$f\left(\frac{iT}{\sigma}\right) = \sum_{n=-\infty}^{+\infty} a_n \cdot \frac{\sin\left[\pi\left(\frac{i}{\sigma} - n\right)\right]}{\pi\left(\frac{i}{\sigma} - n\right)} e^{-\alpha\left[\pi\left(\frac{i}{\sigma} - n\right)\right]^2} = \sum_{n=-\infty}^{+\infty} a_n \cdot c\left(\frac{i}{\sigma}, n\right)$$

c(i/σ,n) converges with increasing n very rapidly to zero, so that, in practice, the approximation can be made, that c(i/σ,n) is equal to zero, as soon as the absolute value of n reaches a predetermined limit value. This limit value depends, in the final analysis, on the required, respectively necessary, accuracy of measurement and is referenced in the following as MaxSamples. It has been found, that a desired accuracy of measurement can be achieved in practice, when the value of MaxSamples lies in the range of about 3 to 10.

In this way, the following equation results:

$$f\left(\frac{iT}{\sigma}\right) = \sum_{n=-MaxSamples}^{+MaxSamples} a_n \cdot c\left(\frac{i}{\sigma}, n\right)$$

The coefficients c(i/σ,n) are calculated once and then stored in a table of size (2×MaxSamples+1)×(σ−1). In this way, essentially a processing of the measured values in real time can be achieved.

| n | i/σ = −0.25 | i/σ = 0.25 | i/σ = 0.5 |
|---|---|---|---|
| −5 | X1 | X2 | X3 |
| . | . | . | . |
| . | . | . | . |
| . | . | . | . |
| 0 | Y1 | Y2 | Y3 |
| . | . | . | . |
| . | . | . | . |
| . | . | . | . |
| 5 | Z1 | Z2 | Z3 |

It is essential, on the basis of the amplitude values sampled in a time range T, to ascertain that point in time $t_{max}$, at which a relative maximum amplitude value (or also a relative minimum amplitude value) of the function f(t) occurs. For example, this value can lie between two sequentially following, sampled values. If $t_{max}$ is known, then it is also possible to determine the actual maximum $f(t_{max})$ (or minimum) of the function f(t).

Figure 2:
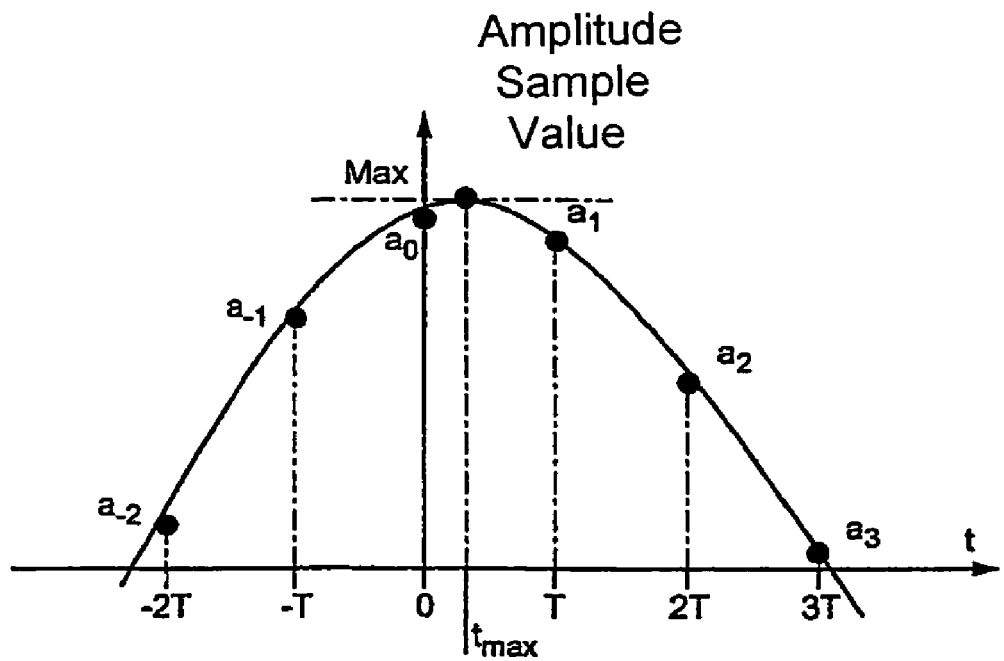
FIG. 2 a schematic presentation of a diagram, wherein the way in which the device of the invention works is visualized and wherein the scanned amplitude values of the measuring signal are plotted against time.

The manner of proceeding is as follows (see also FIG. 2): First a maximum (or minimum) is determined in the time range by comparing the sampled values with one another. Let us assume that $a_0$ corresponds to the maximum value (or the minimum value). Additionally, it is assumed, that at least MaxSamples are present before and behind $a_0$. For practical applications, the parameter MaxSamples lies in the range of 3-10.

In the case of the abscissa value $t_{max}$, the first derivative f'(t) of the function f(t) is equal to zero. The formula is, consequently: $f'(t_{max})=0$. Therefore, $a_0$ is the maximum (or the minimum) of the time range, respectively time interval [$a_i$], with the following holding: $-T < t_{max} < T$.

The value $t_{max}$ can be found by a linear interpolation of the first derivative according to the following formula:

$$t_{max} = -\frac{f'(0)}{f''(0)}$$

As already stated, the following interpolation wavelet is used in the invention:

$$g(x) = \frac{\sin(x)}{x} e^{-\alpha x^2}$$

The first derivative g'(x) and the second derivative g''(x) of the Function g(x) are:

$$g'(x) = \left[-\frac{\sin(x)}{x^2} + \frac{\cos(x)}{x} - 2\alpha \sin(x)\right]e^{-\alpha x^2}$$

$$g''(x) = \left[2\frac{\sin(x)}{x^3} - 2\frac{\cos}{x^2} + (2\alpha - 1)\frac{\sin(x)}{x}4\alpha \cdot \cos(x) + 4\alpha x \cdot \sin(x)\right]e^{-\alpha x^2}$$

A limit value calculation with x=0 leads to g(0)=1, g'(0)=0, g''(0)=(−2α−1)/3.

Therewith, there results for f(t), f'(t), f''(t) the following mathematical equations:

$$f(t) = \sum_{-\infty}^{+\infty} a_n \cdot g\left[\pi\left(\frac{t}{T} - n\right)\right]$$

$$f'(t) = \frac{\pi}{T}\sum_{-\infty}^{+\infty} a_n \cdot g'\left[\pi\left(\frac{t}{T} - n\right)\right]$$

$$f''(t) = \frac{\pi^2}{T^2}\sum_{-\infty}^{+\infty} a_n \cdot g''\left[\pi\left(\frac{t}{T} - n\right)\right]$$

As a result, the following hold for t=0:

$$f'(0) = -\frac{1}{T}\sum_{n \neq 0}(-1)^n \frac{a_n}{n}e^{-\alpha \pi^2 n^2}$$

$$f''(0) = -\frac{1}{T^2}\left[a_0\left(2\alpha + \frac{1}{3}\right)\pi^2 + 2\sum_{n \neq 0}(-1)^n a_n \cdot \left(2\alpha\pi^2 + \frac{1}{n^2}\right)e^{-\alpha\pi^2 n^2}\right]$$

$$t_{max} = -\frac{f'(0)}{f''(0)} = T\frac{\sum_{n=1}^{\infty}(-1)^n \frac{a_{-n} - a_n}{n}e^{-\alpha\pi^2 n^2}}{a_0\left(2\alpha + \frac{1}{3}\right)\pi^2 + 2\sum_{n=1}^{\infty}(-1)^n(a_{-n} + a_n)\cdot\left(2\alpha\pi^2 + \frac{1}{n^2}\right)e^{-\alpha\pi^2 n^2}}$$

If it is additionally assumed, that only the sampled values within the sub time range of $a_{-MaxSamples}$ to $a_{MaxSamples}$ are relevant, then $a_n=0$, when |n|>MaxSamples. The last equation is then:

$$t_{max1} = T\frac{\sum_{n=1}^{MaxSamples}(-1)^n \frac{a_{-n} - a_n}{n}e^{-\alpha\pi^2 n^2}}{a_0\left(2\alpha + \frac{1}{3}\right)\pi^2 + 2\sum_{n=1}^{MaxSamples}(-1)^n(a_{-n} + a_n)\cdot\left(2\alpha\pi^2 + \frac{1}{n^2}\right)e^{-\alpha\pi^2 n^2}}$$

When the range [$a_i$] is vertically shifted into the range [$a_i$−$a_0$], then the last formula can be simplified and one obtains:

$$t_{max2} = T\frac{\sum_{n=1}^{MaxSamples}(-1)^n \frac{a_{-n} - a_n}{n}e^{-\alpha\pi^2 n^2}}{2\sum_{n=1}^{MaxSamples}(-1)^n(a_{-n} + a_n - 2a_0)\cdot\left(2\alpha\pi^2 + \frac{1}{n^2}\right)e^{-\alpha\pi^2 n^2}}$$

In order to find the optimum value for the coefficient α, the equality $t_{max1}=t_{max2}$ should hold, since the abscissa value of the maximum should not change in the case of a translational shifting, since it must be invariant relative to a translation. However, in the strict theory, $t_{max1} \neq t_{max2}$ (even when Max-Samples=∞). The reason is, that the function which interpolates the shifted region [$a_i$−$a_0$] is not a simple translation of the function which interpolates the region [$a_i$]. Therefore, the assumption, that $t_{max1} \approx t_{max2}$, is only valid for the residuum formulated as follows:

$$residue(\alpha, MaxSamples) = 2\alpha + \frac{1}{3} + 4\sum_{n=1}^{MaxSamples}(-1)^n\left(2\alpha + \frac{1}{n^2\pi^2}\right)e^{-\alpha\pi^2 n^2}$$

The absolute value of this residuum is an indicator of how good the selected wavelet is for practical use. The analysis of the residuum by means of a mathematical simulation program (e.g. Mathcad) enables the finding of an optimum value for α for a predetermined number of (2×MaxSamples) around $a_0$. Optimum values for α lie in the order of magnitude of 0.01 to ca. 0.04. If a value for α is inserted, which lies away from the optimum value, then the interpolation function between two sampled values is not 'smooth', respectively it has significant harmonics beyond the Nyquist limit, but small deviations from the optimum value (e.g. 5%) have little influence on the result. This last shows how good the proposed device is for performing practical measurements. Especially, rounding errors affect the measurement results minimally.

In practice, two coefficient tables [$c_i$] and [$d_i$] (0<i≦MaxSamples), are constructed. Then, the following relationship is obtained:

$$t_{max} = T\frac{\sum_{n=1}^{MaxSamples}(a_{-n} - a_n)\cdot c_n}{\sum_{n=1}^{MaxSamples}(a_{-n} + a_n - 2a_0)\cdot d_n} \text{ with}$$

$$c_n = -(-1)^n\frac{e^{-\alpha\pi^2(n^2-1)}}{n} \text{ and}$$

$$d_n = -2\cdot(-1)^n\cdot\left(2\alpha\pi^2 + \frac{1}{n^2}\right)e^{-\alpha\pi^2(n^2-1)}$$

The coefficient domains [$c_i$] and [$d_i$] are normalized, so that the following holds: $c_1=1$. The optimum value for α, which depends on the number of sampled values MaxSamples, is read into a table. The coefficients are calculated and stored in a table. During operation, this means for the microprocessor, respectively the control/evaluation unit, of the ultrasonic flow measuring device, that only simple calculative operations, like additions, 2×MaxSamples multiplications and a division need to be performed.

As already mentioned above a number of times, a travel-time difference method is used for measuring flow by means of an ultrasonic flow measuring device. An ultrasonic pulse is radiated into the pipeline, respectively into the measuring tube, in the stream direction (Up) of the medium being measured, received by an ultrasonic transducer, and, thereafter, a plurality of sampled values [$up_i$] are collected by a high-speed A/D converter within a predetermined time range. The same signal is then sent into the pipeline, respectively into the measuring tube, counter to the stream direction (Down), likewise received by an ultrasonic transducer, and sampled by the A/D converter. Within a predetermined time range, likewise a plurality of sampled values [$dn_i$] are collected. The time difference between the two measurement signals is proportional to the flow velocity of the medium in the pipeline. The two sampled values are correlated with one another according to the formula:

$$corr_i = \sum_{n=-\infty}^{+\infty} up_n dn_{n+i}$$

The maximum value of this range corresponds to the time difference of the two aforementioned ultrasonic measuring signals. For a highly accurate calculation of the volume flow, this correlation method is, however, much too inaccurate. Consequently, the above method of the invention is applied to the correlation function.

Figure 3:
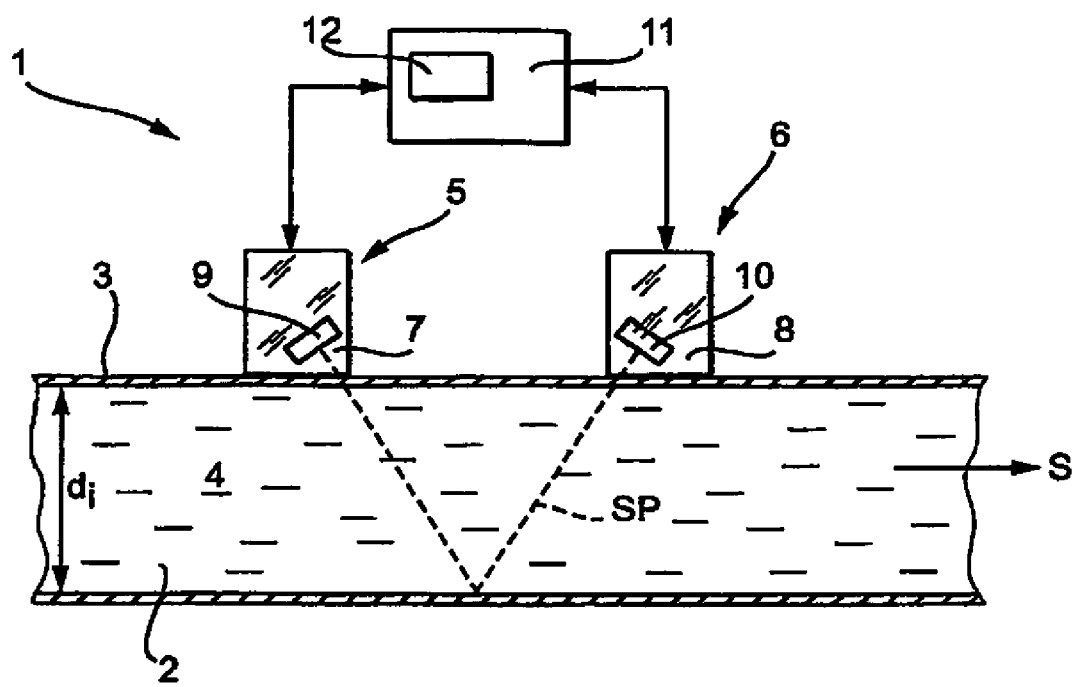
FIG. 3 a schematic presentation of a preferred embodiment of the device of the invention.

FIG. 3 is a schematic presentation of the device of the invention embodied as an inline ultrasonic flow measuring device 1. The ultrasonic flow measuring device 1 determines, using the known travel-time difference method, the volume flow, or mass flow, of the medium 4, which is flowing in the stream direction (S, respectively Up) in the pipeline 2.

Essential components of the inline ultrasonic flow measuring device 1 are the two ultrasonic transducers 5, 6 and the control/evaluation unit 11 with the memory unit 12. The two ultrasonic sensors 5, 6 are applied to the pipeline 2 at a distance L from one another by means of a securement apparatus (not shown). Appropriate securement apparatuses are sufficiently know from the state of the art and are also sold by the assignee. The pipeline 2 has a predetermined inner diameter di.

An ultrasonic transducer 5; 6 includes as an essential component at least one piezoelectric element 9; 10, which produces and/or receives the ultrasonic measuring signals. The ultrasonic measuring signals are, in each case, via the coupling elements 7, 8, coupled into, respectively coupled out of, the pipeline 2 through which the medium is flowing. The coupling elements 7, 8 care for a best possible impedance matching of the ultrasonic measuring signals as they move from one medium into the other. SP indicates the sound path, on which the ultrasonic measuring signals propagate in the pipeline 2, respectively medium 4. The illustrated case is that of a so-called two-traverse arrangement, in which the ultrasonic transducers 5, 6 are arranged. A "traverse" refers, in such case, to that portion of the sound path SP, on which an ultrasonic measuring signal crosses the pipeline 2 one time. The traverses can, depending on the arrangement of the ultrasonic transducers 5, 6 and, as required, with the insertion of a reflector element into the sound path SP, run diametrally or chordally in the pipeline, respectively in the measuring tube, 2.

The invention claimed is:

1. A device for determining and/or monitoring volume flow and/or mass flow of a medium flowing through a pipeline in a stream direction comprising:

at least two ultrasonic transducers, which emit ultrasonic measuring signals into the pipeline and receive ultrasonic measuring signals from the pipeline; and a control/evaluation unit, which ascertains the volume-flow and/or mass-flow of the medium in the pipeline on the basis of the travel-time difference of the ultrasonic measuring signals in the stream direction (S; Up) and counter to the stream direction, wherein:

said control/evaluation unit ascertains a plurality of sampled values ($a_i$ with i=1, 2, 3, . . . ) of a received measuring signal at defined points in time (t) of a predetermined time range, interpolates the predetermined time range of the measuring signal by a continuous function (f(t)), the continuous function (f(t)) being formed by a sum of a predetermined number (n $\in$ N) of wavelets (W), wherein each wavelet (W) corresponds to the product of a sampled value with a sine function $$\left(\frac{\sin(x)}{x}\right)$$

and with a Gaussian bell curve ($e^{-\alpha x^2}, \alpha \in R$).

2. The device as claimed in claim 1, wherein:

said control/evaluation unit determines between the sampled values at least one additional sampled value and approximates this additional sampled value, respectively these additional sampled values, by the continuous function, the continuous function being formed by a sum of a predetermined number (n $\in$ N) of wavelets (W), each wavelet (W) corresponding to the product of a sampled value with a sine function $$\left(\frac{\sin(x)}{x}\right)$$

and with a Gaussian bell curve ($e^{-\alpha x^2}, \alpha \in R$).

3. The device as claimed in claim 1, wherein:

said control/evaluation unit determines an abscissa value (t), at which an ordinate value of the continuous function (f(t)) reaches a predetermined limit value.

4. The device as claimed in claim 3, wherein:

the predetermined limit value of the continuous function (f(t)) is a zero point, a maximum, a minimum or an inflection point.

5. The device as claimed in claim 1, wherein:

said control/evaluation unit determines an abscissa value (tmax, tmin) for a maximum and/or minimum on the basis of the first derivative f'(t) of the continuous function f(t).

6. The device as claimed in claim 1, wherein:

said control/evaluation unit obtains an abscissa value (tmax), at which the continuous function reaches a maximum, by a linear interpolation of the first derivative of the continuous function (f(t)) according to the following formula:

$$t_{max} = t0 - \frac{f'(t0)}{f''(t0)}$$

wherein t0 characterizes the abscissa value of a first approximation, at which a maximum or minimum is measured in the time interval (t0−T, t0+T), and wherein f''(t) represents the second derivative of the continuous function (f(t)).

7. The device as claimed in claim 1, wherein:
said control/evaluation unit correlates, with one another, two ultrasonic measuring signals in two time ranges, interpolates the corresponding, discrete collection of correlation points by a continuous function (f(t)), and determines the abscissa value of the continuous function (f(t)), at which the ordinate value reaches a maximum value, the abscissa value being a measure for a time shift between ultrasonic measuring signals sent and received in the stream direction (S, Up) and counter to the stream direction (Down).

8. The device as claimed in claim 1, wherein:
said calculating/control unit determines by means of a mathematical simulation program, in each case, an optimum value for the coefficient ($\alpha$) as a function of the number of measurement points (MaxSample).

9. The device as claimed in claim 8, further comprising:
a memory unit, in which, in each case, the optimum value for the coefficient ($\alpha$) is stored as a function of the number of measurement points (MaxSample).

\* \* \* \* \*